United States Patent
Powell

(10) Patent No.: US 7,936,535 B2
(45) Date of Patent: May 3, 2011

(54) DATA STORAGE DISC CARRIERS

(75) Inventor: Robin John William Powell, Poole (GB)

(73) Assignee: GSI Group Ltd., Warwickshire (GB)

( * ) Notice: Subject to any disclaimer, the term of this patent is extended or adjusted under 35 U.S.C. 154(b) by 667 days.

(21) Appl. No.: 11/576,983

(22) PCT Filed: Oct. 11, 2005

(86) PCT No.: PCT/GB2005/003901
§ 371 (c)(1),
(2), (4) Date: Apr. 10, 2007

(87) PCT Pub. No.: WO2006/040535
PCT Pub. Date: Apr. 20, 2006

(65) Prior Publication Data
US 2007/0217063 A1      Sep. 20, 2007

(30) Foreign Application Priority Data
Oct. 11, 2004   (GB) .................................. 0422545.4

(51) Int. Cl.
*G11B 17/02* (2006.01)
*G11B 23/00* (2006.01)
(52) U.S. Cl. ....................... 360/99.12; 720/707; 720/713
(58) Field of Classification Search .............. 360/99.12, 360/99.05; 369/270.1; 720/706–714
See application file for complete search history.

(56) References Cited

U.S. PATENT DOCUMENTS

| | | | | |
|---|---|---|---|---|
| 4,249,221 A * | 2/1981 | Cox et al. | ................... | 360/97.02 |
| 5,014,143 A * | 5/1991 | Mori et al. | ................. | 360/99.12 |
| 5,025,340 A * | 6/1991 | Peters | ......................... | 360/99.12 |
| 5,048,005 A * | 9/1991 | Ekhoff | ......................... | 720/707 |
| 5,056,082 A * | 10/1991 | Ekhoff | ......................... | 720/707 |
| 5,542,685 A * | 8/1996 | Allen et al. | ................. | 279/2.02 |
| 5,637,200 A | 6/1997 | Tsymberov | | |
| 5,644,564 A | 7/1997 | Peters | | |
| 7,561,376 B2 * | 7/2009 | Yeom et al. | ................ | 360/99.12 |
| 2003/0103292 A1* | 6/2003 | Yeom | ......................... | 360/99.12 |
| 2003/0156530 A1 | 8/2003 | Powell | | |

OTHER PUBLICATIONS

International Preliminary Report on Patentability dated Mar. 16, 2007.
Search Report and Written Opinion dated Feb. 16, 2006 for PCT/GB2005/003901.

* cited by examiner

*Primary Examiner* — Brian E Miller
*Assistant Examiner* — Adam B Dravininkas
(74) *Attorney, Agent, or Firm* — Alston & Bird LLP

(57) ABSTRACT

A data storage disc carrier (1) for carrying discs (10). The carrier includes an axial clamping mechanism which incorporates a three legged resilient clamping member (7) that can flees between release and clamping positions to allow easy loading a gripping of discs (10). The clamping member is articulatingly mounted on a tail (4) that is gripped to provide clamping.

33 Claims, 6 Drawing Sheets

DATA STORAGE DISC CARRIERS

BACKGROUND OF THE INVENTION

1. Field of the Invention

The present invention relates to data storage disc carriers. More particularly, the present invention relates to data storage disc carriers for holding at least one data storage disc during rotation.

The discs may be arranged to have data written on them either magnetically or optically. Examples of such data storage discs include hard and floppy magnetic discs and CD ROMs.

2. Description of Related Art

One type of existing carrier, which may be used for carrying discs when writing tracks onto the discs, has a disc hub in the form of a tube. Storage discs may be mounted on the hub, with the tube passing through their bores and with spacers between each disc. The discs are clamped to the hub by a T section axial shaft. A tail portion of the T section axial shaft passes through the centre of the hub and is held in position by an axial clamping mechanism. A broad end or "head" of the shaft bears on discs and spacers, clamping them in position.

When storage discs are to be mounted on or removed from the central hub, the T section axial shaft is completely removed from the central hub so that the head of the shaft no longer caps the hub.

During the processing of storage discs it is desirable to keep the discs clean and free from scratches or other damage that may be caused by dirt and other contaminants. However, it has been found that removing the T section axial shaft of some existing carriers can draw oil and other material up through the central hub from the clamping mechanism. This can lead to contaminants falling onto storage discs as the T section axial shaft is removed.

In some instances, the processing of discs is automated. During such an automated process, insertion or removal of the T section axial shaft may be performed by a robot arm acting on the head of the T section axial shaft. The presence of a robot arm above the storage discs further increases the risk of dirt and other contaminants falling on the storage discs.

BRIEF SUMMARY OF THE INVENTION

It is an object of at least some embodiments of the present invention to alleviate at least some of the problems mentioned above.

According to a first aspect of the present invention there is provided a data storage disc carrier for holding at least one data storage disc during rotation about an axis, the data storage disc carrier comprising:

a central hub on which at least one data storage disc may be carried; and an axial clamping arrangement for axially clamping at least one data storage disc carried on the central hub, and comprising a clamping portion which is movable between a clamping position and a release position wherein when the clamping portion is in the clamping position, the clamping portion may act on a carried disc to provide axial clamping on the disc and when the clamping portion is in the release position, the clamping portion is disposed radially inwards of its position when in the clamping position for allowing data storage discs to be loaded onto and/or removed from the hub.

The clamping portion may be arranged to act directly or indirectly on the at least one data storage disc.

In some cases, when in the release position, the clamping portion may be located flush with or radially inwardly of an outer surface of the central hub. Typically, when in the clamping position the clamping portion is located radially outwardly of an outer surface of the central hub.

In some embodiments of the present invention the central hub may comprise a tube portion over which the bores of data storage discs may pass. In such embodiments, when the clamping portion is in the release position, the clamping portion is within the radius of the central hub and data storage discs may be slid on and off the tube portion. However, when the clamping portion is in the clamping position, the clamping portion is disposed beyond the radius of the central hub and the bores of the data storage discs intended for use with that carrier will not be large enough pass over the clamping portion. In this manner the data storage discs may be held on the central hub.

The clamping arrangement may comprise a clamping member of which the clamping portion is a part. The clamping member may be removably attachable to the central hub. In some embodiments, although the clamping member is removable, the clamping arrangement may be arranged so that it is not necessary to remove the clamping member before mounting or removing data storage discs. In some of these embodiments the problems mentioned previously associated with contaminants being drawn up through the central hub may be alleviated.

The clamping member may have a release configuration, in which the clamping portion is in the release position, and a clamping configuration, in which the clamping portion is in the clamping position. The clamping member may be axially displaceable to cause the clamping portion to move between the clamping position and the release position. The clamping member may be deformable between the release configuration and clamping configuration. Deformation of the clamping member between the release configuration and the clamping configuration may cause the clamping portion to move from the release position to the clamping position. The data storage disc carrier may be arranged such that axial movement of the clamping member causes a force to be exerted on the clamping member, deforming the clamping member from a release configuration to a clamping configuration.

The clamping member may be at least partly of flexible material, for example plastics material. The plastics material may be electrostatic dissipative material such as an electrostatic dissipative acetal copolymer, for example Pomalux. The clamping member may be elastically deformable. The clamping portion may be arranged to move between the clamping and release positions by virtue of the elastic properties of the material of the clamping member.

When in the clamping position, the clamping portion may extend down an outer surface of the central hub.

A surface of the clamping portion may rest against an outer surface of the central hub. In such cases, movement of the clamping member relative to the central hub may cause the clamping member to deform so that the clamping portion follows the contour of the outer surface of the central hub.

The outer surface of the central hub in the region of the clamping member may be tapered. The clamping member may be arranged so that axial movement of the clamping member relative to the central hub causes the clamping portion to slide along the taper and move radially by virtue of following the taper.

The data storage disc carrier may be arranged so that the clamping member is mountable at a region towards one end of the central hub. In such a case, the central hub may be tapered towards one end.

The clamping member may comprise an leg which comprises the clamping portion. The clamping member may comprise a plurality of clamping portions. The clamping member may comprise a plurality of clamping legs, each of the legs comprising a respective clamping portion. The clamping legs may be arranged to splay when the clamping member is moved from the release configuration to the clamping configuration.

The data storage disc carrier may comprise a cap to cover at least part of the clamping member. The cap may be attachable to the central hub. In such data storage disc carriers, the cap may be shaped to accommodate the clamping portion of the clamping member. Where the clamping member comprises a plurality of legs, the cap may be shaped to accommodate the clamping legs. The cap may comprise a plurality of slots to accommodate the clamping legs of the clamping member.

The axial clamping arrangement may comprise a clamping assembly having a head portion and a tail portion. The head portion may comprise the clamping member. The tail portion may extend axially through the central hub. The data storage disc carrier may be arranged so that the tail portion extends axially through the central hub during normal use.

The tail portion may be operable to displace the clamping member axially, moving the clamping portion between the clamping position and the release position. In some embodiments, the clamping member may be remotely operable to clamp and release data storage discs. In some such embodiments, aforementioned problems associated with the presence of a robot arm above the data storage discs may be alleviated.

The clamping arrangement may comprise biasing means for biasing the clamping assembly and applying axial clamping force to carried discs. The data storage disc carrier may be arranged so that the biasing means biases the clamping assembly in such a way as to cause the clamping portion to tend towards the clamping position. The biasing means may axially bias the clamping assembly.

The biasing means may act on the tail portion of the clamping assembly with connection between the tail and head transferring the effect of the biasing means to the head so that, where discs are carried, the force is then exerted on the discs via the head. The biasing means may comprise spring means for exerting a force on the clamping assembly. The spring means may comprise at least one wave spring. In some embodiments, the spring means may comprise a pair of wave springs separated by a spacer. The tail portion of the clamping assembly may comprise a flange upon which the spring means acts.

The biasing means may comprise a mechanism for limiting axial movement of the clamping assembly. The mechanism may comprise a stop. The stop may be axially movable within the central hub. The data storage disc carrier may be arranged such that axial movement of the clamping assembly is limited by a surface of the flange of the tail portion abutting with the stop of the adjustment mechanism.

The head portion may be articulatingly mounted to the tail portion. This can allow clamping force applied to the head via the tail to be evenly distributed by the head on the clamped discs.

The head portion may be connected to the tail portion by a ball-and-socket joint.

The term ball-and-socket joint in this context should be construed broadly to include any joint in which a suitably shaped part moves within a cup-like socket so as to allow movement in several directions. The ball-and-socket joint may be arranged to allow movement equivalent to movement allowed by a gimbal mounting.

The tail portion may comprise an elongate portion on which is mounted a ball. The head may define a rounded cavity for receiving the ball. The head may define an aperture in the base of the cavity through which the elongate portion of the tail passes. In data storage disc carriers of this type, the head may rotate and/or pivot relative to the tail portion. The range of movement is to some degree limited by contact between the tail portion and the sides of the aperture through which it passes.

The data storage disc carrier may be a data storage disc carrier for carrying a plurality of data storage discs. Where a stack of discs is carried by the carrier, one disc may be separated from the next by a respective spacer element.

According to a second aspect of the present invention there is provided a data storage disc carrier for holding at least one data storage disc during rotation about an axis, the data storage disc carrier comprising:

a central hub upon which the at least one data storage disc may be carried, the central hub being tapered towards one end; and a clamping member provided on the central hub and comprising a clamping portion for axially clamping at least one data storage disc carried on the central hub, the clamping portion being movable between a clamping position and a release position wherein, when the clamping portion is in the clamping position, the clamping portion is disposed radially outwards of its position when in the release position, the data storage disc carrier being arranged so that, when the clamping member is disposed on the central hub, a surface of the clamping portion rests against the tapered surface of the central hub and movement of the clamping member axially relative to the central hub causes the clamping portion to follow the tapered surface of the central hub.

According to a third aspect of the present invention there is provided a data storage disc carrier clamping member comprising a plurality of clamping legs arranged about an axis, each leg comprising a respective clamping portion for axially clamping at least one data storage disc carried on a data storage disc carrier, wherein each clamping portion is movable between a clamping position and a release position such that when the clamping portion is in the clamping position, the clamping portion may act on a carried disc to provide axial clamping on the disc and when the clamping portion is in the release position, the clamping portion is disposed radially inwards of its position when in the clamping position for allowing data storage discs to be loaded onto and/or removed from the hub.

Optional features described with respect to the first aspect of the present invention may also be optional features of the second and third aspects of the present invention.

BRIEF DESCRIPTION OF THE SEVERAL
VIEWS OF THE DRAWINGS

An embodiment of the present invention will be described now, by way of example only, with reference to the accompanying drawings in which.

DETAILED DESCRIPTION OF THE INVENTION

Figure 1:
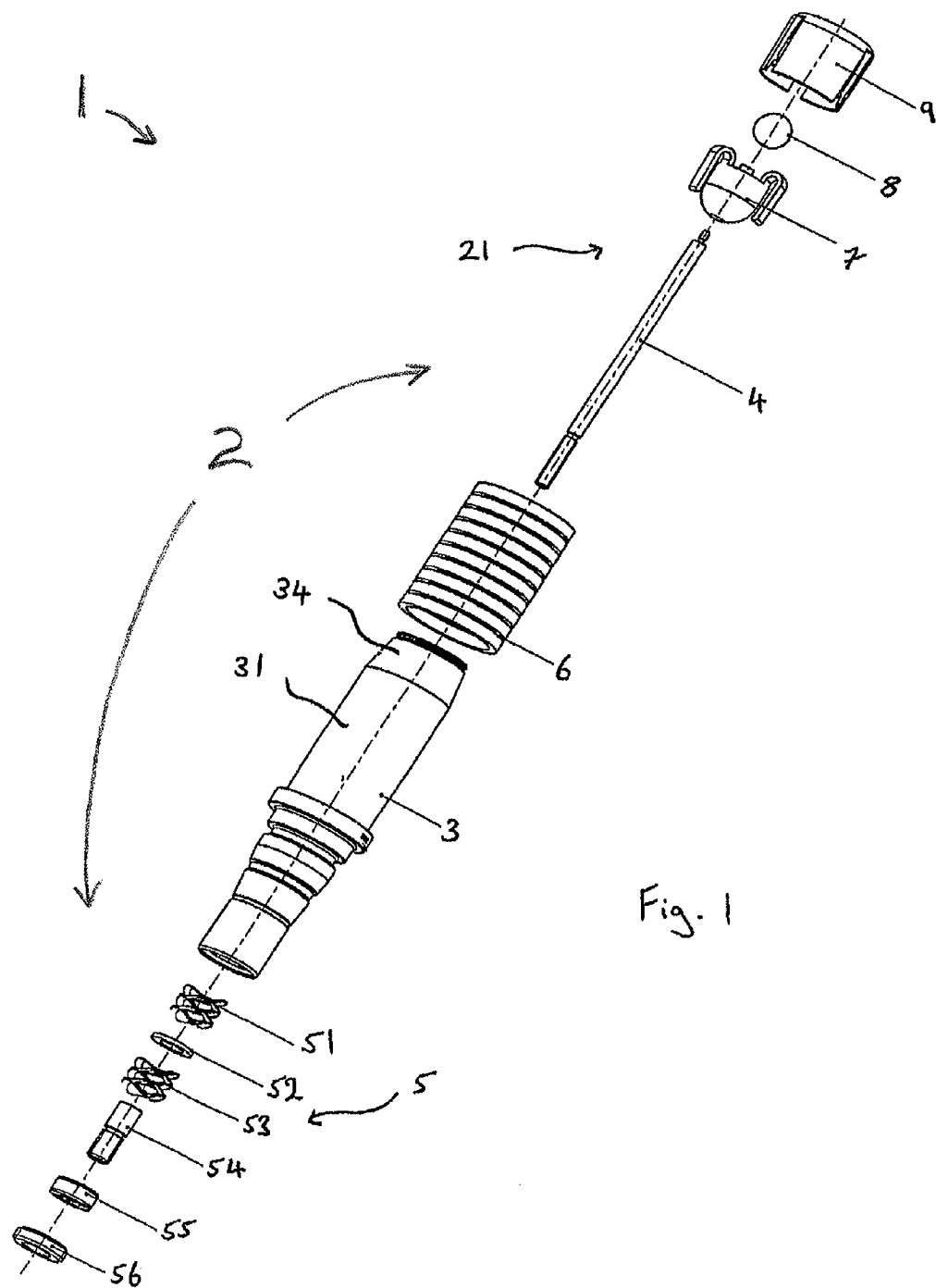
FIG. 1 is an exploded view showing parts of a data storage disc carrier.

FIGS. 1, 4, 5 and 6 show various parts of a data storage disc carrier 1, which has a clamping arrangement 2 arranged to clamp data storage discs 10 (see FIG. 4) for rotation with a central hub 3.

The data storage disc carrier 1 may be used for carrying data storage discs 10 during processing, for example during the writing of tracks onto the discs. In use, a plurality of data storage discs 10 may be loaded onto the central hub 3; each disc spaced from another by a respective spacer 6. Once loaded onto the central hub 3, the data storage discs 10 are axially clamped by the clamping arrangement 2 so that the carried discs 10 can be rotated with hub 3.

The clamping arrangement comprises a clamping assembly 21 for bearing on the discs 10 and a biasing means 5 which acts on the clamping assembly 21 to provide an axial force to clamp the discs 10.

The central hub 3 is formed of a single piece of machined metal and has a generally tube-like structure with a bore passing through its centre. The central hub 3 is provided with a cylindrical portion 31 for carrying data storage discs 10. One end of this cylindrical portion 31 blends into a tapered portion 34 with which the clamping assembly interacts as will be explained in more detail further below.

The clamping assembly 21 comprises a head portion and a tail portion. The tail portion comprises a clamp shaft 4 and a ball 8, the clamp shaft 4 has a projection 41 at one end which snap fits into a recess 81 (see FIG. 4) in the ball 8. The head portion comprises a clamping member in the form of a three-legged spider 7 and a top cap 9.

Figure 2:
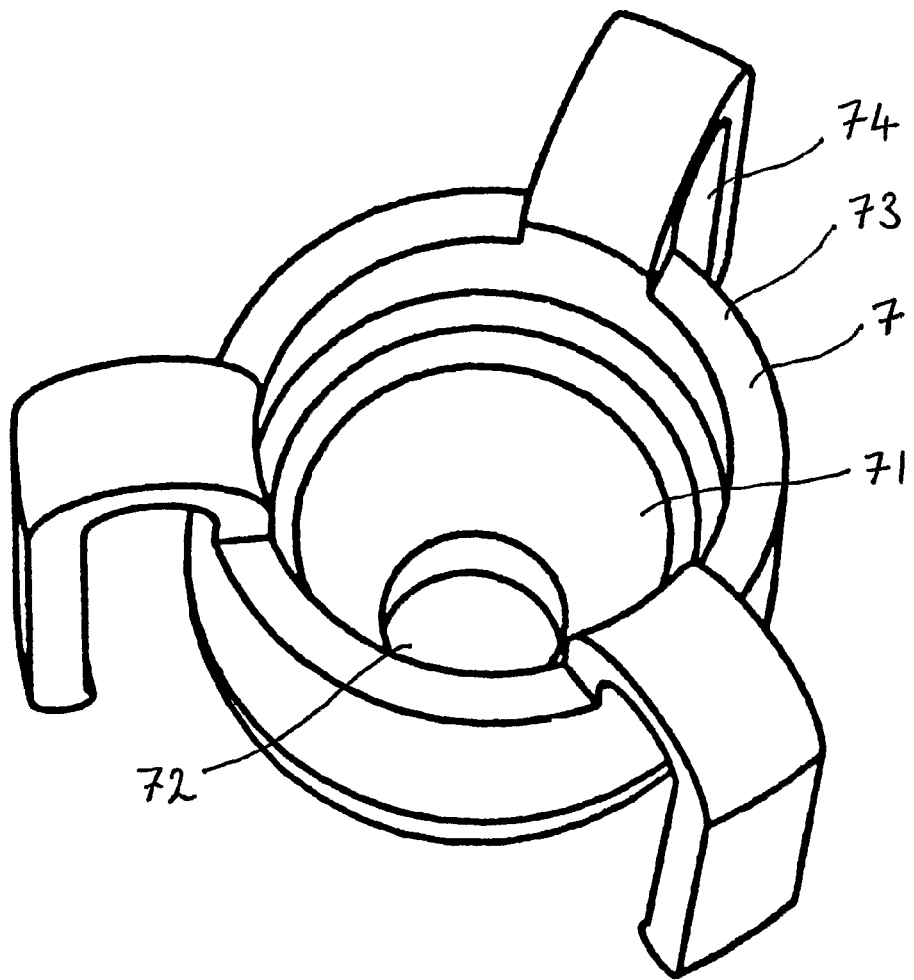
FIG. 2 is a perspective view of a three-legged spider which is part of the data storage disc carrier shown in FIG. 1.

The three-legged spider 7 is a moulded plastic article. In the embodiment shown, the three-legged spider is made of Pomalux electrostatic dissipative acetal copolymer. As may more clearly be seen from FIG. 2, the three-legged spider 7 has a cup shaped body 71, which, in this embodiment, is moulded to form a central hemispherical recess. In the base of the cup-shaped body 71 is provided a central aperture 72. Equally spaced around the rim 73 of the cup shaped body 71 of the three-legged spider 7 are provided three clamping legs 74 for clamping the data storage discs 10.

Each of the clamping legs 74 overhangs the edge of the cup shaped body 71 and this means that the legs 74 may extend down the surface of the tapered portion 34 when the clamping member is installed on the hub 3.

Figure 4:
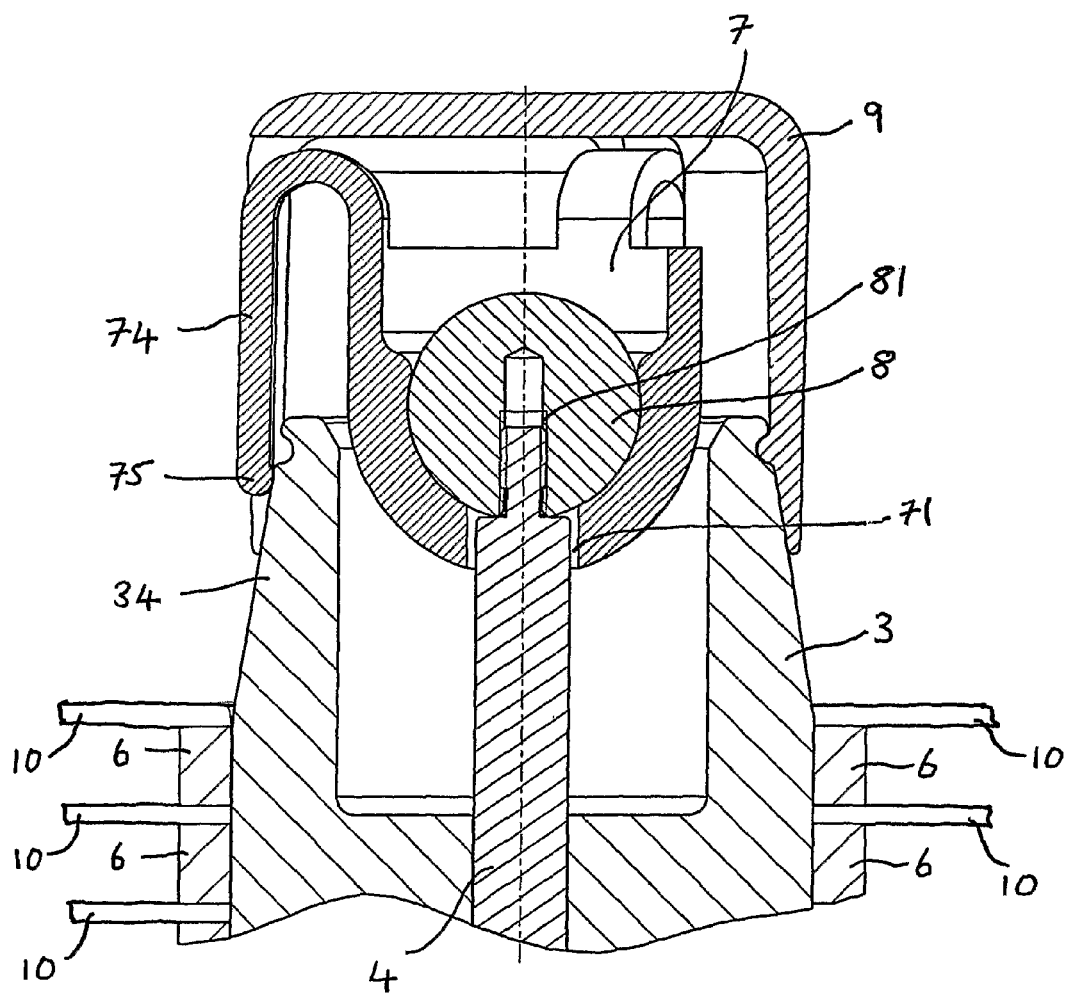
FIG. 4 is a section through an upper portion of the data storage disc carrier shown in FIG. 1 when the three-legged spider is in a release configuration.
Figure 5:
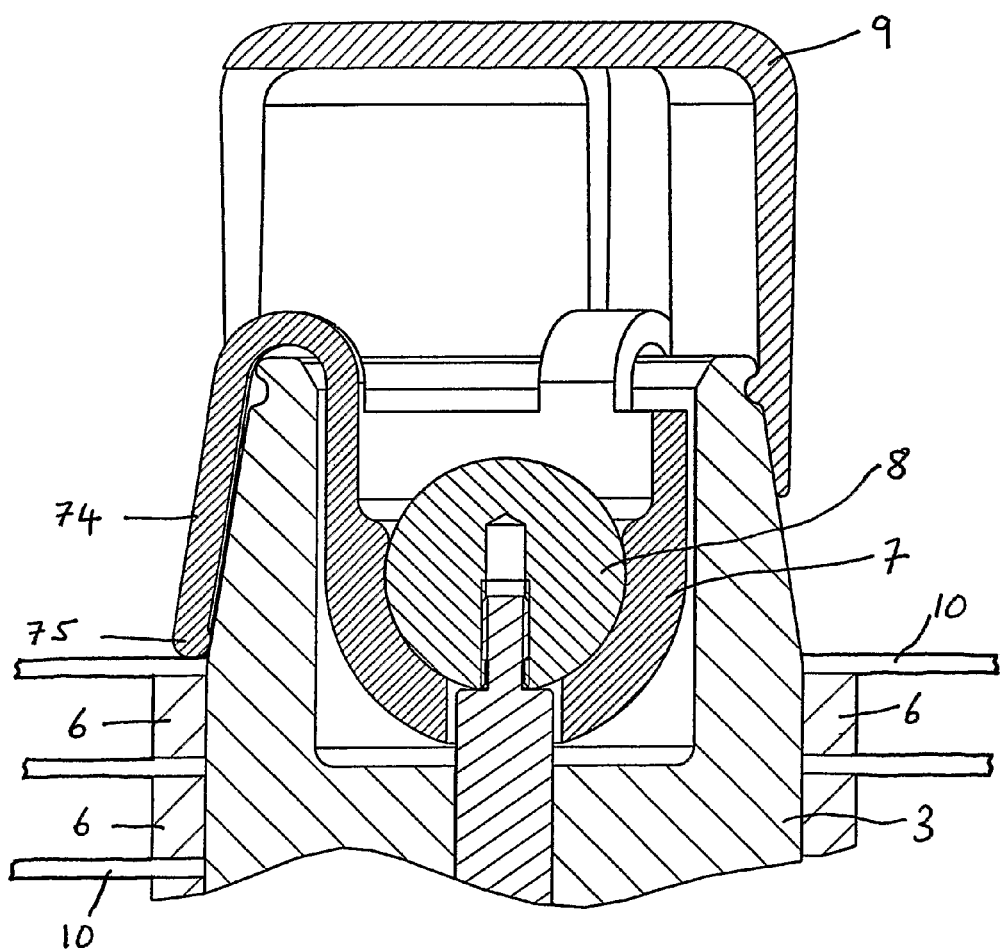
FIG. 5 is a section through an upper portion of the data storage disc carrier shown in FIG. 1 when the three-legged spider is in a clamping configuration.

As can be seen in FIGS. 4 and 5, when assembled the clamp shaft 4 passes through the aperture 72 in the three-legged spider 7 and the projection 41 of the clamp shaft 4 lockingly engages the recess 81 in the ball 8. Thus the head and tail portions of the clamping assembly are held together by the ball 8 resting in the hemispherical recess 71 of the three-legged spider 7. This configuration allows pivoting of the three-legged spider 7 relative to the clamp shaft 4 in a manner equivalent to a gimbal mounting.

Figure 3:
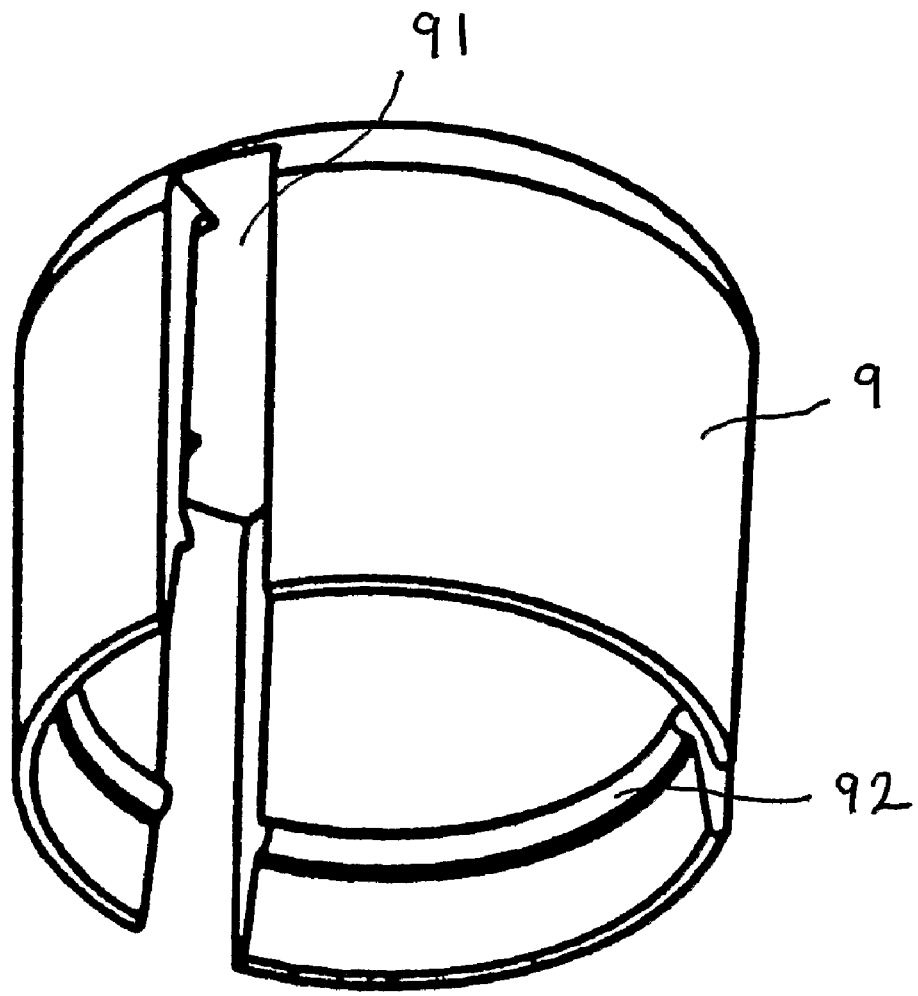
FIG. 3 is a perspective view of a top cap which is part of the data storage disc carrier shown in FIG. 1.

The structure of the top cap 9 may be more clearly seen in FIG. 3. The top cap 9, which is made of plastics material, forms a cylinder which is closed at one end. Three slots 91 are provided running axially along the sides of the top cap 91 in a configuration that matches the configuration of the legs 74 of the three-legged spider 7. The inside of the top cap 9 is provided with a circumferential rib 92.

When the top cap 9 and three-legged spider 7 are fitted to the central hub 3, the legs 74 of the three-legged spider 7 pass through the slots 91 of the top cap 9. The sides of the top cap 9 extend over the three-legged spider 7 so that the circumferential rib 92 engages with a circumferential recess provided towards an upper end of the tapered portion 34 of the central hub 3.

Figure 6:
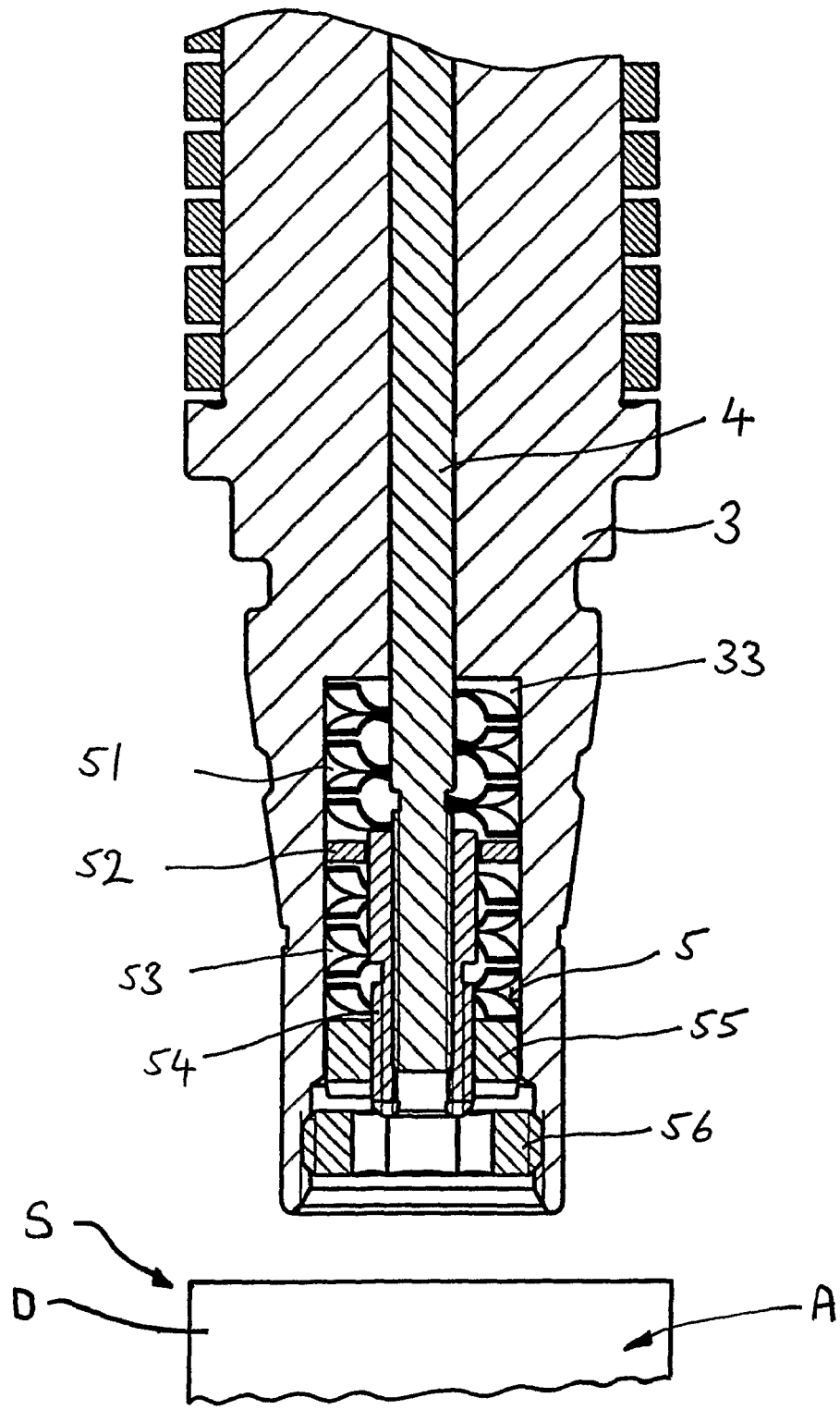
FIG. 6 is a section through a lower portion of the data storage disc carrier shown in FIG. 1.

Referring now to FIG. 6, a lower portion of the bore of the central hub 3 enlarges to form a chamber 33 which accommodates the biasing means 5. The biasing means comprises a first wave spring 51, a spacer washer 52, a second wave spring 53, a piston portion 54, a stop 55 and a grub screw 56.

The grub screw 56 is in the form of a threaded metal ring. The grub screw 56 threadingly engages with the inner surface of the chamber 33 and may be screwed in and out of the chamber 33 to increase or decrease the effective size of the chamber 33.

In the assembled state, as shown in FIG. 6, the clamp shaft 4 extends through the central hub 3 and passes into the chamber 33. The end of the clamp shaft 4 in chamber 33 is threaded and the piston portion 54 is threaded onto the clamp shaft 4 and in turn the stop 55 is threaded onto the piston portion 54. The shaft 4 with the piston portion 54 and stop 55 attached can slide axially within the chamber 33. The grub screw 56 serves to capture the piston 54 and stop 55 within the chamber 33.

In the assembled state, captured between the stop 55 and the upper end of the chamber 33 are the first wave spring 51 and the second wave spring 53, which are separated by the spacer washer 52. The captured wave springs 51 and 53 press on the upper end of the chamber 33 and the stop 55, exerting an axial force on the clamp shaft 4. The spacer washer 52 that is provided between the first and second wave springs acts as a buffer and prevents the two wave springs collapsing into one another which would reduce available travel. When the device is not being used to clamp discs, the stop 55 is forced against the grub screw 56 and this contact avoids over stressing of the three-legged spider 7.

In use, the biasing means 5 applies an axial force on the clamp shaft 4, pulling the three-legged spider 7 axially towards the biasing means. The three-legged spider 7 has configuration which is illustrated in FIG. 4 and a clamping configuration which is illustrated in FIG. 5. The release configuration is achieved by pushing (for example using a rod introduced through the grub screw 56) on the end of the clamp shaft 4 in the chamber 33 to relieve the spider 7 of the force of the springs 51, 53. In the release configuration discs 10 and spacers 6 may be loaded onto and removed from the hub 3. The clamping configuration is achieved by allowing the spring force to act on the spider 7. When in the clamping configuration the spider can act to clamp discs 10 and spacers carried on the hub 3.

It will be noted that the disc carrier 1 provides pre-loading on carried discs. That is, the default position of the disc carrier 1 is an axially clamped position. Actuation is needed to release carried discs. Moreover, the actuation mechanism, for example, a push rod and drive mechanism is external to the disc carrier 1. Thus the actuation mechanism need not rotate with the discs. This can help with stability of rotation and also helps minimise the cost of each carrier 1.

FIG. 4 shows an upper portion of the data storage disc carrier 1 when the three-legged spider is in the release configuration. In this configuration the legs 74 of the three-legged spider 7 depend roughly parallel with the sides of the cup shaped body 71 and are just resting on the upper part of the tapered portion 34 of the central hub 3. The ends of the clamping legs 74 are resting on the narrow part of the taper portion 34 and the legs 74 as a whole are within the radius of the outer surface of the outer surface of the cylindrical portion 31 of the hub 3.

When the three-legged spider 7 is in the release configuration, data storage discs 10 may be loaded onto and removed from the cylindrical portion 31 of the central hub 3. During the loading process, bores of the data storage disc 10 may be passed over the outer surface of the top cap 9 and over the legs 74 of the three-legged spider 7 onto the cylindrical portion 31 of the central hub 3. When the three-legged spider 7 is in the release configuration the three clamping portions of the spider 7, i.e. the respective end of each of the legs 74 are in respective release positions.

FIG. 5 shows the upper portion of the data storage disc carrier 1 when carrying discs 10 and when the three-legged spider 7 is in a clamping configuration to clamp the discs 10. In this Figure, the three-legged spider 7 has been moved axially towards the biasing means 5 from the position shown in FIG. 4 by the spring force. As the movement occurs, the clamping portions of the spider ride up the taper portion 34 of the hub 3 and so moving radially outward. It will be noted that each leg 74 terminates with a bulbous portion 75. The bulbous portions 75 act as the clamping portions and also ride on the surface of the taper portion 34.

When the three-legged spider 7 is in the clamping position, the clamping legs 74 have been pulled down the hub 3 so as to ride up the tapered portion 34, splaying the legs 74. The bulbous portions 75 at the ends of the legs 74 are thereby brought into contact with an upper data storage disc 10. In this configuration, the ends of the clamping legs 74 have spread radially from their position when the three-legged spider 7 was in the release configuration and the top cap 9 remains secured to the tapered portion 34.

The bulbous portions 75 help to ensure that the force applied to the clamped discs is in an axial direction. This is due to the way that the bulbous portion rides on the taper and contacts the disc. It will be seen that the direction of force applied to the discs would tend to be inclined relative to the axis of the device if the legs slide directly down the taper and no bulbous portion or other projection or rounded part were provided. It should be noted that, in other embodiments, the clamping portions may apply force indirectly to the discs, for example via a top spacer 6.

Force applied to the three-legged spider 7 by the clamp shaft 4 during clamping is transferred via the ball 8 resting in the hemispherical recess of the three-legged spider 7. This results in an even distribution of force from the clamp shaft 4 to the three legs of the three-legged spider 7 and thus helps to equalise the force applied to the clamped discs 10.

The range of movement of the clamping assembly 21 and the force it applies to carried discs may be varied by adjusting the biasing means 5.

The force applied to the clamped discs is dependent on the space available to the springs 51, 53 in the chamber, which controls the tension under which the springs are put. The space available for the springs 51, 53 and hence the pretension of the device is controlled by moving the position of stop 55 on the piston portion 54. It will be recalled that the stop 55 is threadingly mounted on the piston 54 so the stop 55 may be "screwed" to the desired position.

As alluded to above, when the three-legged spider 7 is to be moved from the clamping configuration to the release configuration, a rod (not shown) may be inserted into the lower end of the central hub 3, through the aperture in the grub screw 56, to clamp shaft 4. The clamp shaft 4 can then be pushed back up the central hub 3, compressing the wave springs 51, 53. This moves the three-legged spider 7 away from the central hub 3. This causes the clamping legs 74 to slide back up the central hub 3 allowing the clamping legs 74 to slide down the taper and move radially inwards. As previously noted, when the three-legged spider is in the release position, data storage discs 10 may be slid on and off the cylindrical portion 31 of the central hub 3.

Operation of the data storage disc carrier 1, as described above, removes the need to release data storage discs 10 by applying a force to the clamping arrangement 2 from above the data storage discs 10. This reduces the chance of contaminants falling on the data storage discs 10.

There is also no need to remove the clamping assembly 21 from the hub 3 to load or unload data storage discs 10 from the cylindrical portion 31. Indeed, during normal operation of this data storage disc carrier 1 this is not possible.

The hub 3 is arranged to be releasably mountable on a drive spindle for rotatingly driving the hub and carried discs. The mounting is such that the hub 3 can be removed as a whole from a drive spindle by a simple robotic operation. This can further help in automating processes by allowing the hub to be robotically moved on and off station in contrast to a hub that is bolted in position.

FIG. 6 schematically shows part of a drive station S on which the carrier 1 can be mounted. Such a drive station S comprises a drive spindle D for rotatingly driving the carrier 1 and carried discs and a clamping arrangement actuator A (including for example, a push rod) for operating the clamping arrangement of the carrier 1. Part of the drive station S will rotate with the carrier 1, and part will remain rotationally stationary in normal use.

The invention claimed is:

1. A data storage disc carrier for holding at least one data storage disc during rotation about an axis, the data storage disc carrier comprising:
   a central hub on which at least one data storage disc may be carried; and
   an axial clamping arrangement for axially clamping at least one data storage disc carried on the central hub, and comprising a plurality of clamping portions which are movable between a clamping position and a release position wherein when each clamping portion is in the clamping position, each clamping portion may act on a carried disc to provide axial clamping on the disc and when each clamping portion is in the release position, each clamping portion is disposed radially inwards of its position when in the clamping position for allowing data storage discs to be loaded onto and/or removed from the hub, wherein the axial clamping arrangement comprises a clamping assembly having a head portion and a tail portion, the head portion being articulatingly mounted to the tail portion and comprising a clamping member of which the plurality of clamping portions are a part, such that the clamping portions can all commonly pivot as a unit relative to the tail portion, and the tail portion extending axially through the central hub during normal use.

2. A data storage disc carrier according to claim 1 in which the tail portion is operable to displace the clamping member axially, moving said clamping portion between the clamping position and the release position.

3. A data storage disc carrier according to claim 1 in which the axial clamping arrangement comprises a biasing arrangement for biasing the clamping assembly and applying axial clamping force to carried discs, the biasing arrangement being arranged to act on the tail portion of the clamping assembly with connection between the tail and head transferring the effect of the biasing arrangement to the head so that, where discs are carried, the force is then exerted on the discs via the head.

4. A data storage disc carrier according to claim 3 in which the biasing arrangement comprises a spring for exerting a force on the clamping assembly.

5. A data storage disc carrier according to claim 3 in which the biasing arrangement comprises at least one wave spring.

6. A data storage disc carrier according to claim 3 in which the biasing arrangement comprises a pair of wave springs separated by a spacer.

7. A data storage disc carrier according to claim 1 in which the head portion is connected to the tail portion by a ball-and-socket joint.

8. A data storage disc carrier according to claim 1 arranged so that, when in the release position, said clamping portion is located flush with or radially inwardly of an outer surface of the central hub.

9. A data storage disc carrier according to claim 1 in which the clamping member has a release configuration, in which the clamping portion is in the release position, and a clamping configuration, in which said clamping portion is in the clamping position.

10. A data storage disc carrier according to claim 9 in which the clamping member is deformable between the release configuration and clamping configuration.

11. A data storage disc carrier according to claim 10 which is arranged such that axial movement of the clamping member causes a force to be exerted on the clamping member, deforming the clamping member from the release configuration to the clamping configuration.

12. A data storage disc carrier according to claim 1 in which the central hub comprises a tube portion over which the bores of data storage discs may pass arranged so that:
    when said clamping portion is in the release position, said clamping portion is within the radius of the central hub and data storage discs may be slid on and off the tube portion; and
    when said clamping portion is in the clamping position, said clamping portion is disposed beyond the radius of the central hub and the bores of the data storage discs intended for use with that carrier will not be large enough to pass over said clamping portion.

13. A data storage disc carrier according to claim 1 in which the clamping member is removably attachable to the central hub.

14. A data storage disc carrier according to claim 13 in which the clamping arrangement is arranged so that it is not necessary to remove the clamping member before mounting or removing data storage discs.

15. A data storage disc carrier according to claim 1 in which the clamping member is axially displaceable to cause said clamping portion to move between the clamping position and the release position.

16. A data storage disc carrier according to claim 1 in which the clamping member is at least partly of flexible material.

17. A data storage disc carrier according to claim 16 in which the flexible material is electrostatic dissipative material such as an electrostatic dissipative acetal copolymer.

18. A data storage disc carrier according to claim 1 in which, when in the clamping position, said clamping portion extends down an outer surface of the central hub.

19. A data storage disc carrier according to claim 1 in which a surface of said clamping portion rests against an outer surface of the central hub.

20. A data storage disc carrier according to claim 19 which is arranged so that movement of the clamping member relative to the central hub causes the clamping member to deform so that said clamping portion follows the contour of the outer surface of the central hub.

21. A data storage disc carrier according to claim 20 in which the outer surface of the central hub in the region of the clamping member is tapered and the clamping member is arranged so that axial movement of the clamping member relative to the central hub causes said clamping portion to slide along the taper and move radially by virtue of following the taper.

22. A data storage disc carrier according to claim 1 in which the clamping member comprises a leg which comprises said clamping portion.

23. A data storage disc carrier according to claim 1 in which the clamping member comprises a plurality of clamping legs, each of the legs comprising a respective one of the plurality of clamping portions.

24. A data storage disc carrier according to claim 23 in which the clamping legs are arranged to splay when the clamping member is moved from a release configuration to a clamping configuration.

25. A data storage disc carrier according to claim 1 which comprises a cap to cover at least part of the clamping member.

26. A data storage disc carrier according to claim 1 in which said clamping portion is arranged to act directly on the at least one data storage disc.

27. A data storage disc carrier according to claim 1 in which the axial clamping arrangement is biased towards a clamping position when no external force is exerted on the carrier.

28. A data storage disc carrier according to claim 1 in which the axial clamping arrangement is arranged for actuation by an actuator which is distinct from the carrier.

29. A data storage disc carrier according to claim 1 which is arranged for releasable mounting on a drive spindle.

30. A data storage disc carrier arrangement comprising a data storage disc carrier according to claim 1 and a clamping arrangement actuator for operating the clamping arrangement wherein the clamping arrangement is arranged for rotation with the hub relative to the clamping arrangement actuator.

31. A data storage disc carrier arrangement according to claim 30 and further comprising a drive spindle for rotatingly driving the carrier and carried discs, wherein the disc carrier is releasably mounted on the drive spindle.

32. A data storage disc carrier for holding at least one data storage disc during rotation about an axis, the data storage disc carrier comprising:
    a central hub upon which the at least one data storage disc may be carried, the central hub being tapered towards one end; and
    a clamping assembly comprising a tail portion extending axially through the central hub and a head portion, the head portion being articulatingly mounted to the tail portion and comprising a clamping member having plurality of clamping portions for axially clamping at least one data storage disc carried on the central hub, each clamping portion being movable between a clamping position and a release position wherein, when each clamping portion is in the clamping position, each clamping portion is disposed radially outwards of its position when in the release position,
    the data storage disc carrier being arranged so that, when the clamping member is disposed on the central hub, a surface of each clamping portion rests against the tapered surface of the central hub and movement of the clamping member axially relative to the central hub causes each clamping portion to follow the tapered surface of the central hub, such that the clamping portions can all commonly pivot as a unit relative to the tail portion.

33. A data storage disc carrier clamping assembly comprising a tail portion articulatingly mounted to a head portion, the head portion comprising a clamping member comprising a plurality of clamping legs arranged about an axis, each leg comprising a respective clamping portion for axially clamping at least one data storage disc carried on a data storage disc carrier, wherein the tail portion is for being received axially in a data storage disc carrier and each clamping portion is movable between a clamping position and a release position such that when the clamping portion is in the clamping position, the clamping portion may act on a carried disc to provide axial clamping on the disc and when the clamping portion is in the release position, the clamping portion is disposed radially inwards of its position when in the clamping position for allowing data storage discs to be loaded onto and/or removed from the hub, such that the clamping portions can all commonly pivot as a unit relative to the tail portion.

* * * * *